(12) United States Patent
Wang et al.

(10) Patent No.: US 9,041,377 B2
(45) Date of Patent: May 26, 2015

(54) PSEUDO CONSTANT ON TIME CONTROL CIRCUIT AND STEP-DOWN REGULATOR

(75) Inventors: Rui Wang, Chengdu (CN); Zhengwei Zhang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 350 days.

(21) Appl. No.: 13/538,815

(22) Filed: Jun. 29, 2012

(65) Prior Publication Data

US 2013/0002221 A1 Jan. 3, 2013

(30) Foreign Application Priority Data

Jun. 30, 2011 (CN) .......................... 2011 1 0181295

(51) Int. Cl.
*G05F 1/00* (2006.01)
*H02M 3/158* (2006.01)
*H02M 1/00* (2006.01)

(52) U.S. Cl.
CPC ...... *H02M 3/158* (2013.01); *H02M 2001/0003* (2013.01)

(58) Field of Classification Search
CPC .......................................................... G05F 1/00
USPC .......... 323/222, 225, 268, 271, 282, 283, 285
See application file for complete search history.

(56) References Cited

U.S. PATENT DOCUMENTS

| | | | | |
|---|---|---|---|---|
| 7,482,791 B2 * | 1/2009 | Stoichita et al. | ............... | 323/271 |
| 7,482,793 B2 * | 1/2009 | Stoichita | ....................... | 323/282 |
| 8,427,128 B2 * | 4/2013 | Tsai | .............................. | 323/284 |
| 8,604,767 B2 * | 12/2013 | Liu | .............................. | 323/284 |
| 8,749,216 B2 * | 6/2014 | Li et al. | ......................... | 323/283 |
| 2010/0134080 A1 * | 6/2010 | Ouyang | ........................ | 323/282 |

* cited by examiner

*Primary Examiner* — Matthew Nguyen
(74) *Attorney, Agent, or Firm* — Perkins Coie LLP

(57) ABSTRACT

A step-down regulator comprising a pseudo constant on time control circuit is disclosed, comprising an on-time generator configured to receive a switching signal provided by the step-down regulator and a control signal provided by the pseudo constant on time control circuit, and generates an on-time signal; a feedback control circuit configured to receive a feedback signal representative of the output voltage of the step-down regulator and generate an output signal; and a logic control circuit coupled to the on-time generator and the feedback control circuit to receive the on-time signal and the output signal and generating the control signal, and a power stage configured to receive an input voltage and the control signal and generate the switching signal.

18 Claims, 8 Drawing Sheets

PSEUDO CONSTANT ON TIME CONTROL CIRCUIT AND STEP-DOWN REGULATOR

CROSS-REFERENCE TO RELATED APPLICATION(S)

This application claims the benefit of CN application No. 201110181295.3, filed on Jun. 30, 2011, and incorporated herein by reference.

TECHNICAL FIELD

The present disclosure relates generally to switching circuits, and more particularly but not exclusively to a pseudo constant on time control circuit and step-down regulators using it.

BACKGROUND

PWM (Pulse Width Modulation) control, constant-off-time control and COT (Constant-on-time) control techniques are generally used in step-down regulators.

When COT control is used, the compensation network in the regulator can be eliminated to get a simple structure. Moreover, the regulator with COT control does not need error amplifiers to regulate the output voltage and thus has a better transient response. Because of the above advantages and other advantages, the COT control technique is widely used in step-down regulators.

In COT control, the peak current of the regulator remains constant and the switching frequency varies with the output power to provide a required output voltage. Thus, for applications needing fixed switching frequency, the COT control is no longer applicable.

To solve the problem of variable switching frequency in the COT control, pseudo constant on time (PCOT) control is used in step-down regulators.

In step-down regulators, the duty cycle D is given by Equation (1) as follows:

$$D = \frac{T_{on}}{T_{sw}} = \frac{V_{out}}{V_{in}} \quad (1)$$

, wherein $T_{on}$ represents the on time of the regulator, $T_{sw}$ represents the switching period, $V_{in}$ represents the input voltage of the regulator, and $V_{out}$ represents the output voltage.

Based on the Equation (1), the switching frequency $F_{sw}$ of the step-down regulator can be expressed as Equation (2):

$$F_{sw} = \frac{1}{T_{sw}} = \frac{V_{out}}{V_{in}} \cdot \frac{1}{T_{on}} \quad (2)$$

In PCOT control, the on time $T_{on}$ of the regulator is proportional to the ratio of the output voltage $V_{out}$ to the input voltage $V_{in}$, given by Equation (3) as follows:

$$T_{on} = n \frac{V_{out}}{V_{in}} \quad (3)$$

where n is a constant factor.

As can be observed from Equations (2) and (3), in PCOT control, the switching frequency $F_{sw}$ of the step-down regulator can be expressed as Equation (4):

$$F_{sw} = \frac{1}{n} \quad (4)$$

As can be observed from the Equation (4), the switching frequency $F_{sw}$ is constant as the factor n is constant. That is, in PCOT control, the switching frequency $F_{sw}$ of the step-down regulator remains constant and does not vary with the output power.

In PCOT control, to ensure the on time $T_{on}$ of the regulator be proportional to $V_{out}/V_{in}$, one of the prior art step-down regulators comprises an output voltage pin VOUT in the chip to receive the output voltage $V_{out}$. The output voltage pin VOUT increases the package size of the regulator chip and also the cost. Besides the output voltage pin VOUT, a frequency setting pin FREQ and/or an external frequency setting resistor $R_{TON}$ may also be needed in some prior art step-down regulator chips, which causes larger package size and higher cost.

FIG. 1 illustrates a prior art step-down regulator 10. As shown in FIG. 1, the step-down regulator 10 comprises a PCOT control circuit 101 and a power stage 102. The PCOT control circuit 101 comprises a constant-on-time (COT) generator 1011, a feedback control circuit 1012 and a logic control circuit 1013.

Referring to FIG. 1, the COT generator 1011 comprises a comparator COMP, a capacitor $C_{TON}$ and a switch K. The first terminals of the capacitor $C_{TON}$ and the switch K are coupled to the non-inverting input terminal of the comparator COMP. The control terminal of the switch K receives a control signal Q provided by the PCOT control circuit 101. The second terminals of the switch K and the capacitor $C_{TON}$ are coupled to ground. The comparator COMP receives the output voltage $V_{out}$ at its inverting input terminal and generates an on-time signal $S_1'$ at its output terminal. The feedback control circuit 1012 receives a feedback signal $V_{fb}$ and provides an output signal to the logic control circuit 1013. The logic control circuit 1013 receives the on-time signal $S_1'$ and provides the control signal Q as the output of the PCOT control circuit 101. The power stage 102 receives an input voltage signal $V_{in}$ and the control signal Q, and provides a switching signal SW.

Referring to FIG. 1, the COT generator 1011 receives the output voltage $V_{out}$ through the output voltage pin VOUT, and receives the information of the input voltage $V_{in}$ through the frequency setting pin FREQ and the external frequency setting resistor $R_{TON}$. Thus, the step-down regulator with the prior art COT generator 1011 comprises the output voltage pin VOUT, the frequency setting pin FREQ and the external frequency setting resistor $R_{TON}$.

In the step-down regulator 10 of FIG. 1, the package size and the cost are both increased because of the output voltage pin VOUT, the frequency setting pin FREQ and the external frequency setting resistor $R_{TON}$.

SUMMARY

In one embodiment, the present disclosure is directed to a step-down regulator comprising a pseudo constant on time control circuit. The pseudo constant on time control circuit comprises an on-time generator configured to receive a switching signal provided by the step-down regulator and a control signal provided by the pseudo constant on time control circuit, wherein based on the switching signal and the control signal, the on-time generator generates an on-time signal; a feedback control circuit configured to receive a feedback signal representative of the output voltage of the step-down regulator and generate an output signal in accordance with the feedback signal; and a logic control circuit coupled to the on-time generator and the feedback control circuit to receive the on-time signal and the output signal, wherein based on the on-time signal and the output signal, the logic control circuit generates the control signal. The step-down regulator further comprises a power stage configured to receive an input voltage and the control signal, wherein based on the input voltage and the control signal, the power stage generates the switching signal.

In one embodiment, the present disclosure is directed to a pseudo constant on time control circuit for a step-down regulator, comprising an on-time generator configured to receive a switching signal provided by the step-down regulator and a control signal provided by the pseudo constant on time control circuit, wherein based on the switching signal and the control signal, the on-time generator generates an on-time signal; a feedback control circuit configured to receive a feedback signal representative of the output voltage of the step-down regulator and generate an output signal in accordance with the feedback signal; and a logic control circuit coupled to the on-time generator and the feedback control circuit to receive the on-time signal and the output signal, wherein based on the on-time signal and the output signal, the logic control circuit generates the control signal.

In one embodiment, the present disclosure is directed to a step-down regulator, comprising an on-time generator configured to receive a switching signal provided by the step-down regulator and a control signal, wherein based on the switching signal and the control signal, the on-time generator generates an on-time signal; a minimum off time generator configured to receive the control signal and generate a minimum off time signal in accordance with the control signal; a comparator configured to receive a feedback signal representative of the output voltage of the step-down regulator and a reference signal, and wherein based on the feedback signal and the reference signal, the comparator generates a comparison signal; an and-gate coupled to the comparator and the minimum off time generator to receive the comparison signal and the minimum off time signal, wherein based on the comparison signal and the minimum off time signal, the and-gate generates an output signal; a flip-flop having a set terminal, a reset terminal and an output terminal, wherein the reset terminal is coupled to the on-time generator to receive the on-time signal, and the set terminal is coupled to the and-gate to receive the output signal, wherein based on the on-time signal and the output signal, the flip-flop generates the control signal; and a power stage coupled to the output terminal of the flip-flop to receive the control signal, wherein based on the control signal, the power stage converts an input voltage into the switching signal.

BRIEF DESCRIPTION OF THE DRAWINGS

FIG. 7(2) illustrates an operational amplifying circuit X2 in accordance with another embodiment of the present disclosure.

DETAILED DESCRIPTION

Figure 1:
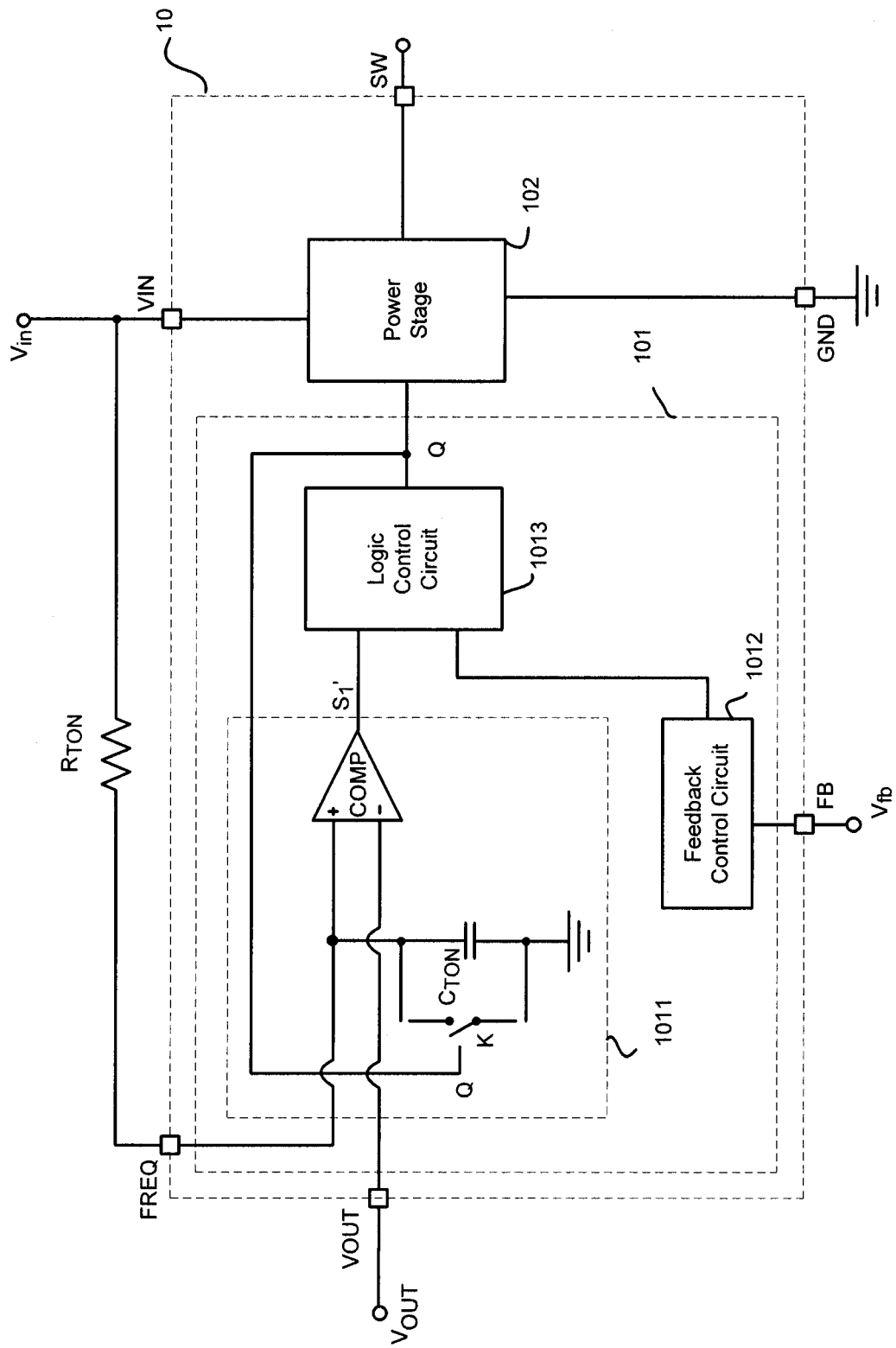
FIG. 1 illustrates a prior art step-down regulator 10.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references. The meaning of "in" includes "in" and "on."

Figure 2:
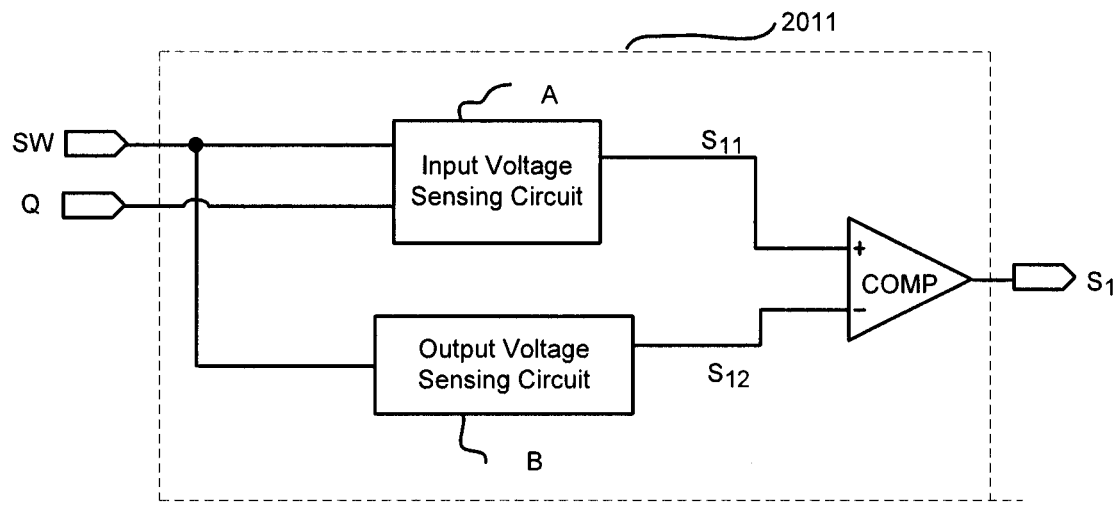
FIG. 2 illustrates an on-time generator 2011 in accordance with one embodiment of the present disclosure.

FIG. 2 illustrates an on-time generator 2011 in accordance with one embodiment of the present disclosure. The on-time generator 2011 is used in step-down regulators with PCOT control.

Referring to FIG. 2, the on-time generator 2011 comprises an input voltage sensing circuit A, an output voltage sensing circuit B and a comparator COMP. The input voltage sensing circuit A receives a switching signal SW provided by a step-down regulator and a control signal Q provided by a PCOT control circuit, and provides an input voltage sensing signal $S_{11}$ to the non-inverting input terminal of the comparator COMP. The output voltage sensing circuit B receives the switching signal SW, and provides an output voltage sensing signal $S_{12}$ to the inverting input terminal of the comparator COMP. The comparator COMP compares the input voltage sensing signal $S_{11}$ with the output voltage sensing signal $S_{12}$ to generate an on-time signal $S_1$.

Figure 3:
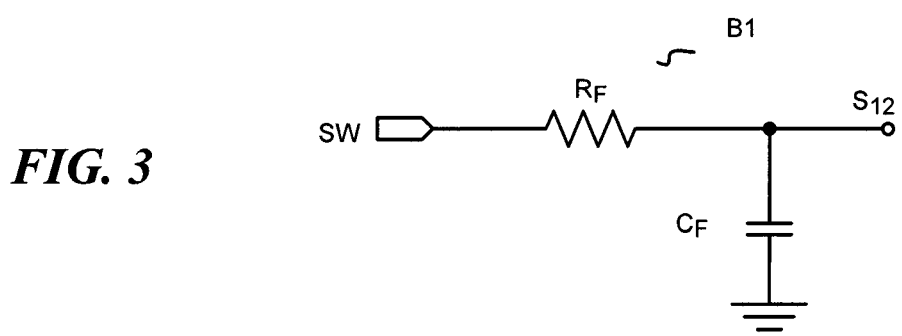
FIG. 3 illustrates an output voltage sensing circuit B1 in accordance with one embodiment of the present disclosure.

FIG. 3 illustrates an output voltage sensing circuit B1 in accordance with one embodiment of the present disclosure. As shown in FIG. 3, the output voltage sensing circuit B1 comprises a resistor $R_F$ and a capacitor $C_F$. The first terminal of the resistor $R_F$ receives the switching signal SW, and the second terminal of the resistor $R_F$ is coupled to the first terminal of the capacitor $C_F$. The second terminal of the capacitor $C_F$ is coupled to ground. The second terminal of the resistor $R_F$ and the first terminal of the capacitor $C_F$ are configured as the output terminal of the output voltage sensing circuit B1 which provides the output voltage sensing signal $S_{12}$.

The output voltage sensing circuit B1 of FIG. 3 is a first-order low-pass passive filter configured by a resistor and a capacitor. Persons of ordinary skill in the art will recognize, however, that in some other embodiments, the output voltage sensing circuit may be a first-order active filter, $N^{th}$-order passive filter, or $N^{th}$-order active filter, where N is an integer greater than 2. Persons of ordinary skill in the art will also recognize that in some other embodiments, the output voltage sensing circuit can be other circuits which can provide the information of the output voltage.

Figure 4:
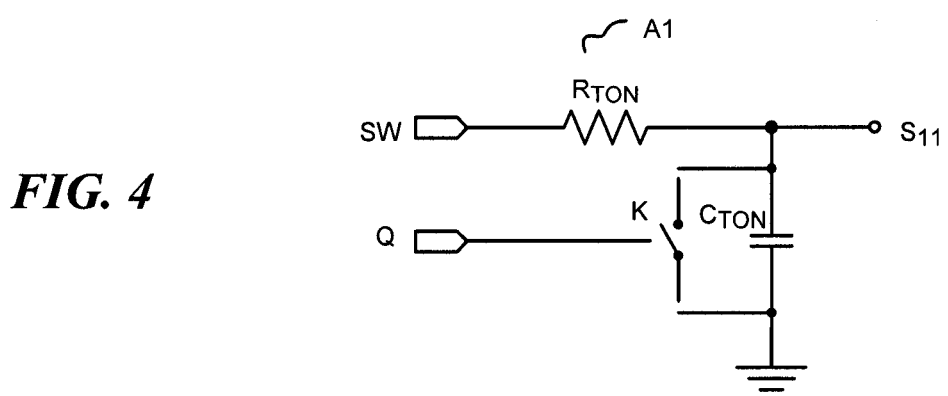
FIG. 4 illustrates an input voltage sensing circuit A1 in accordance with one embodiment of the present disclosure.

FIG. 4 illustrates an input voltage sensing circuit A1 in accordance with one embodiment of the present disclosure. As shown in FIG. 4, the input voltage sensing circuit A1 comprises a resistor $R_{TON}$, a capacitor $C_{TON}$ and a switch K. The first terminal of the resistor $R_{TON}$ receives the switching signal SW, and the second terminal of the resistor $R_{TON}$ is coupled to the first terminal of the capacitor $C_{TON}$. The second terminal of the capacitor $C_{TON}$ is coupled to ground. The switch K is coupled to the capacitor $C_{TON}$ in parallel and controlled by the control signal Q. The second terminal of the resistor $R_{TON}$ and the first terminal of the capacitor $C_{TON}$ are configured as the output terminal of the input voltage sensing circuit A1 which provides the input voltage sensing signal $S_{11}$.

As can be observed from FIG. 4, if the input voltage sensing circuit comprises a RC charging circuit configured by a resistor and a capacitor, the input voltage sensing signal generated by the input voltage sensing circuit is non-linear. For a linear $V_{out}/V_{in}$, the on-time signal generated by the corresponding on-time generator is also non-linear because of the non-linear input voltage sensing signal. Thus, the present disclosure provides an improved linear input voltage sensing circuit which generates an input voltage sensing signal varying linearly with the input voltage $V_{in}$. Accordingly, the on-time generator comprising the linear input voltage sensing circuit generates a linear on-time signal for a linear $V_{out}/V_{in}$.

Figure 5:
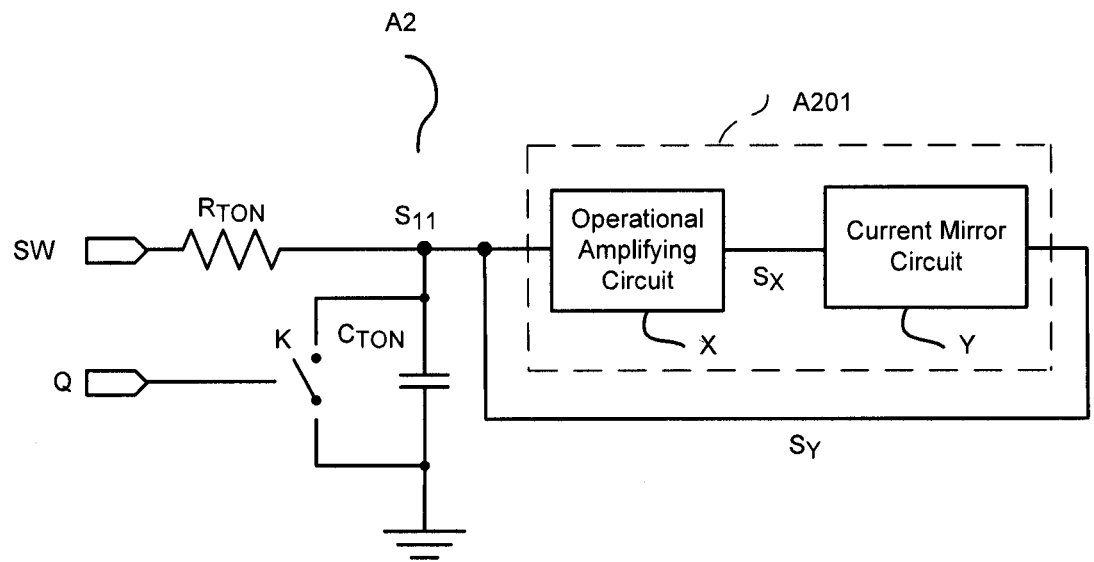
FIG. 5 illustrates an improved linear input voltage sensing circuit A2 in accordance with one embodiment of the present disclosure.

FIG. 5 illustrates an improved linear input voltage sensing circuit A2 in accordance with one embodiment of the present disclosure. As shown in FIG. 5, the linear input voltage sensing circuit A2 of FIG. 5 further comprises a linear current compensation circuit A201 compared with the input voltage sensing circuit A1 of FIG. 4. The linear current compensation circuit A201 receives the input voltage sensing signal $S_{11}$ and provides a linear compensation current $S_y$ to the capacitor $C_{TON}$ to get the input voltage sensing signal $S_{11}$ varying linearly with $V_{in}$. The linear current compensation circuit A201 comprises an operational amplifying circuit X and a current mirror circuit Y. Referring to FIG. 5, the operational amplifying circuit X receives the input voltage sensing signal $S_{11}$ and generates an operational amplifying output signal $S_X$. The current mirror circuit Y receives the operational amplifying output signal $S_X$ and provides the linear compensation current $S_y$ to the capacitor $C_{TON}$. The linear compensation current $S_Y$ works together with the current provided by the switching signal SW through the resistor $R_{TON}$ so that the linear input voltage sensing circuit A2 provides a linear input voltage sensing signal for a linear $V_{in}$.

Figure 6:
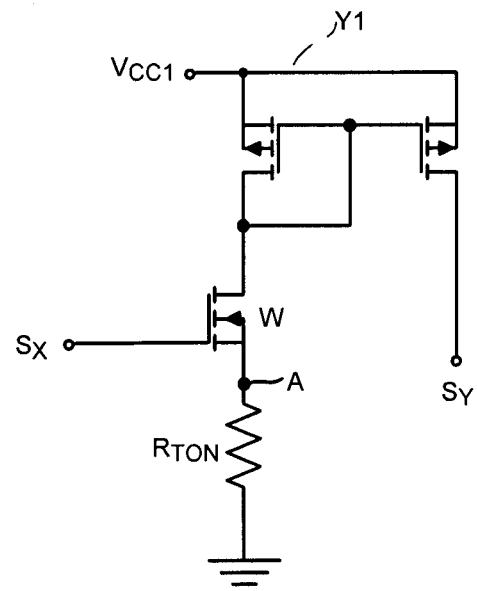
FIG. 6 illustrates a current mirror circuit Y1 in accordance with one embodiment of the present disclosure.

FIG. 6 illustrates a current mirror circuit Y1 in accordance with one embodiment of the present disclosure. As shown in FIG. 6, the current mirror circuit Y1 comprises a current mirror, a resistor $R_{TON}$ and a linear voltage regulating component W. The current mirror receives a power supply $V_{CC1}$. The first terminal of the linear voltage regulating component W is coupled to the current mirror, and the control terminal of the linear voltage regulating component W receives the operational amplifying output signal $S_X$. The first terminal (node A) of the resistor $R_{TON}$ is coupled to the second terminal of the linear voltage regulating component W, and the second terminal of the resistor $R_{TON}$ is coupled to ground. As shown in FIG. 6, the current mirror circuit Y1 generates the linear compensation current $S_Y$.

Persons of ordinary skill in the art will recognize that the resistor $R_{TON}$ of FIG. 6 and the resistor $R_{TON}$ of FIG. 5 have the same resistance. Although a metal oxide semiconductor field effect transistor (MOSFET) is used as the linear voltage regulating component W in the embodiment of FIG. 6, persons of ordinary skill in the art will recognize that, however, in some other embodiments, the linear voltage regulating component W may be a bipolar junction transistor (BJT) or other components or circuits with similar function.

Figure 7:
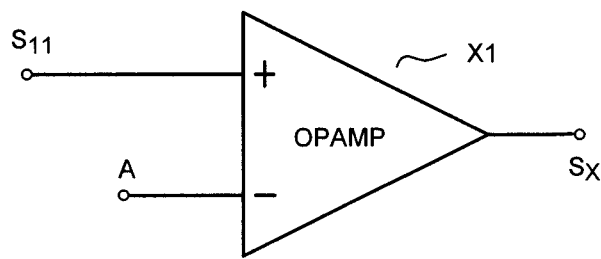
FIG. 7(1) illustrates an operational amplifying circuit X1 in accordance with one embodiment of the present disclosure.
Figure 7:
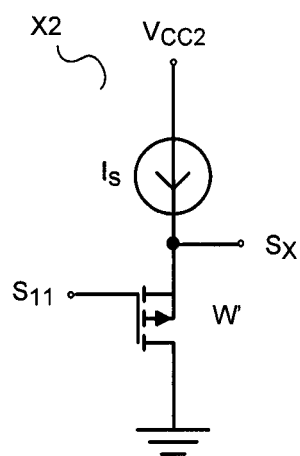

FIG. 7(1) illustrates an operational amplifying circuit X1 in accordance with one embodiment of the present disclosure. As shown in FIG. 7(1), the operational amplifying circuit X1 comprises an operational amplifier OPAMP. The non-inverting input terminal of the operational amplifier OPAMP receives the input voltage sensing signal $S_{11}$, and the inverting input terminal of the operational amplifier OPAMP is coupled to the first terminal (node A) of the resistor $R_{TON}$ of FIG. 6. The operational amplifier OPAMP provides the operational amplifying output signal $S_X$ to the current mirror circuit Y at its output terminal.

The operational amplifier used as the operational amplifying circuit in the embodiment of FIG. 7(1) may increase the size of the linear input voltage sensing circuit also the cost. Thus, the present disclosure provides an improved operational amplifying circuit which reduces the circuit size and cost.

FIG. 7(2) illustrates an operational amplifying circuit X2 in accordance with one embodiment of the present disclosure. As shown in FIG. 7(2), the operational amplifying circuit X2 comprises a current source $I_S$ and a component W'. The component W' has opposite characteristic parameters to that of the linear voltage regulating component W of FIG. 6. As shown in FIG. 7(2), the input terminal of the current source $I_S$ is coupled to a power supply $V_{CC2}$, and the output terminal of the current source $I_S$ is coupled to the first terminal of the component W'. The second terminal of the component W' is coupled to ground, and the control terminal of the component W' is coupled to the output terminal of the input voltage sensing circuit to receive the input voltage sensing signal $S_{11}$. With the operational amplifying circuit X2 of FIG. 7(2) and the current mirror circuit Y1 of FIG. 6, for a linear $V_{in}$, the input voltage sensing circuit generates a linear input voltage sensing signal, and correspondingly, the on-time generator generates a linear on-time signal for a linear $V_{out}/V_{in}$. Moreover, the circuit size and the cost are both reduced with the operational amplifying circuit X2.

Figure 8:
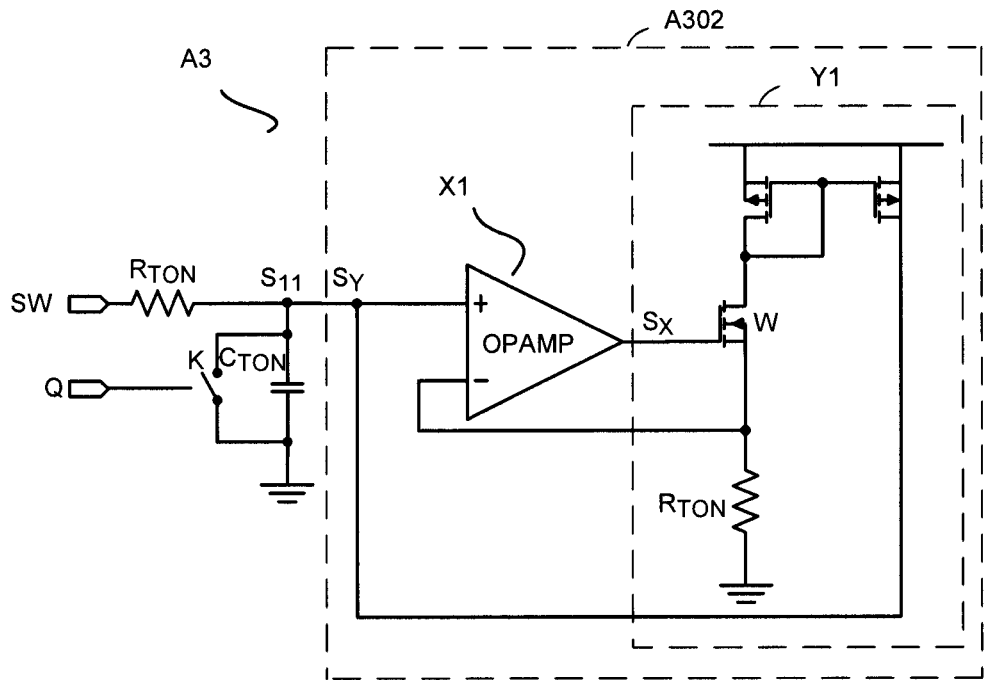
FIG. 8 illustrates a linear input voltage sensing circuit A3 comprising the operational amplifying circuit X1 of FIG. 7(1) and the current mirror circuit Y1 of FIG. 6.

FIG. 8 illustrates a linear input voltage sensing circuit A3 comprising the operational amplifying circuit X1 of FIG. 7(1) and the current mirror circuit Y1 of FIG. 6. The linear input voltage sensing circuit A3 comprises a linear current compensation circuit A302 including the operational amplifying circuit X1 of FIG. 7(1) and the current mirror circuit Y1 of FIG. 6. As shown in FIG. 8, when the switch K is off, the capacitor $C_{TON}$ is charged, the charging current $I_{charge}$ is given by Equation (5) as follows:

$$I_{charge} = \frac{(V_{SW} - V_{s11})}{R_{TON}} + \frac{V_{s11}}{R_{TON}} = \frac{V_{SW}}{R_{TON}} \qquad (5)$$

where $V_{SW}$ and $V_{S11}$ respectively represents the voltages at the switching node of the regulator and the output terminal of the input voltage sensing circuit. As can be observed from Equation (5), the charging current $I_{charge}$ of the capacitor $C_{TON}$ is decided by the resistor $R_{TON}$ and the voltage at the switching node of the regulator. That is, for a linear $V_{in}$, the charging current $I_{charge}$ of the capacitor $C_{TON}$ is linear, and therefore the input voltage sensing signal $S_{11}$ provided by the linear input voltage sensing circuit is linear. As a result, the on-time signal provided by the corresponding on-time generator is also linear for a linear $V_{out}/V_{in}$.

Similarly, for the input voltage sensing circuit comprising the operational amplifying circuit X2 of FIG. 7(2) and the current mirror circuit of FIG. 6, the charging current $I_{charge}$ of the capacitor $C_{TON}$ is given by the Equation (6) as follows:

$$I_{charge} = \frac{(V_{SW} - V_{s11})}{R_{TON}} + \frac{V_{s11} - V_{GSW} + V_{GSW'}}{R_{TON}} = \frac{V_{SW}}{R_{TON}} \qquad (6)$$

where $V_{GSW}$ and $V_{GSW'}$ respectively represents the gate-source voltages of the components W and W'. As can observed from Equation (6), for a linear $V_{in}$, the charging current $I_{charge}$ of the capacitor $C_{TON}$ is linear, and therefore the input voltage sensing signal $S_{11}$ provided by the linear input voltage sensing circuit is linear. As a result, the on-time signal provided by the corresponding on-time generator is also linear for a linear $V_{out}/V_{in}$.

Figure 9:
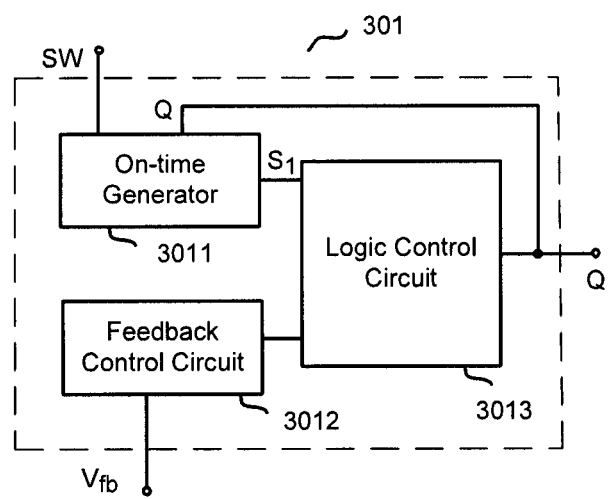
FIG. 9 illustrates a PCOT control circuit 301 in accordance with one embodiment of the present disclosure.

FIG. 9 illustrates a PCOT control circuit 301 in accordance with one embodiment of the present disclosure. The PCOT control circuit 301 is used in step-down regulators and comprises the on-time generator in accordance with the embodiments of the present disclosure. According to one embodiment of the present disclosure, the PCOT control circuit 301 is an integrated circuit.

As shown in FIG. 9, the PCOT control circuit 301 comprises an on-time generator 3011, a feedback control circuit 3012 and a logic control circuit 3013. The on-time generator 3011 receives a switching signal SW provided by a step-down regulator and a control signal Q provided by the PCOT control circuit 301, and generates an on-time signal $S_1$. The feedback control circuit 3012 receives a feedback signal $V_{fb}$ and generates an output signal. The logic control circuit 3013 receives the on-time signal $S_1$ and the output signal provided by the feedback control circuit 3012, and generates the control signal Q. As shown in FIG. 9, compared with the prior art PCOT control circuit 101 of FIG. 1, the PCOT control circuit used in the step-down regulator in accordance with embodiments of the present disclosure receives the switching signal SW provided by the step-down regulator and the feedback signal $V_{fb}$, and generates the control signal Q. The PCOT control circuit can receive the information of the output voltage $V_{out}$ without the output voltage pin VOUT, and can also receive the information of the input voltage $V_{in}$ without the frequency setting pin FREQ and the external frequency setting resistor $R_{TON}$. Thus, when the PCOT control circuit is used in the step-down regulators, the chip size and the cost are both reduced.

Figure 10:
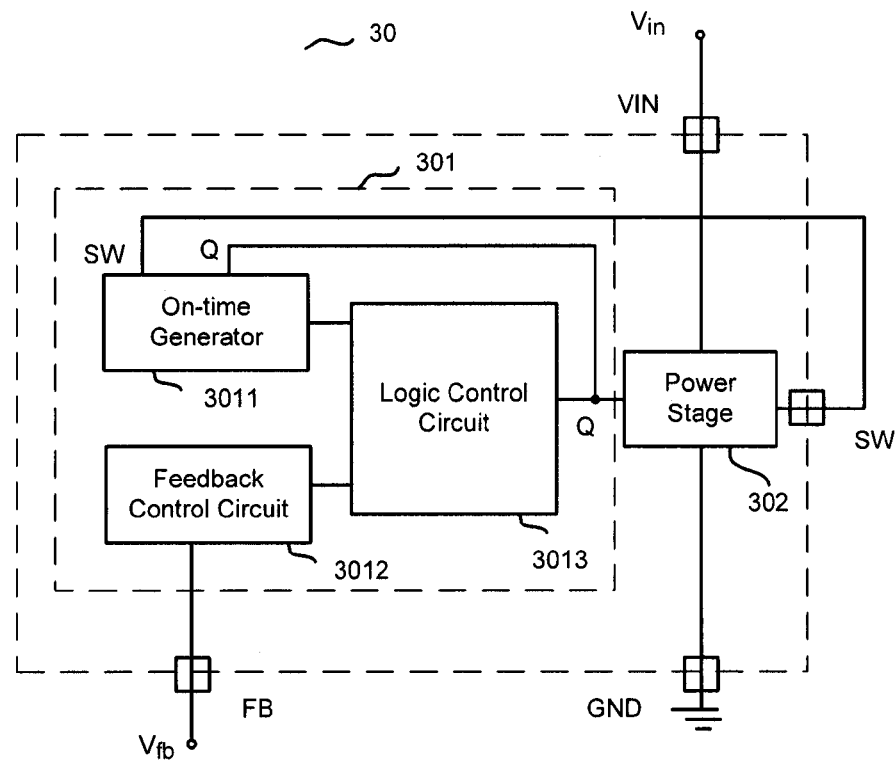
FIG. 10 illustrates a step-down regulator 30 comprising the PCOT control circuit 301 of FIG. 9 in accordance with one embodiment of the present disclosure.

FIG. 10 illustrates a step-down regulator 30 comprising the PCOT control circuit 301 of FIG. 9. According to one embodiment of the present disclosure, the step-down regulator 30 is an integrated circuit. As shown in FIG. 10, the step-down regulator 30 comprises a PCOT control circuit 301 and a power stage 302. The PCOT control circuit 301 receives the switching signal SW provided by the step-down regulator 30 and the feedback signal $V_{fb}$, and provides the control signal Q. The power stage 302 receives the control signal Q and the input voltage $V_{in}$, and provides the switching signal SW. As shown in FIG. 10, compared with the step-down regulator 10 of FIG. 1, the step-down regulator 30 in accordance with one embodiment of the present disclosure comprises an input voltage pin VIN, a feedback signal pin FB, a switching pin SW and a ground pin GND. The step-down regulator 30 may not comprise the output voltage pin VOUT, and may not comprise the frequency setting pin FREQ and the external frequency setting resistor $R_{TON}$. Thus, the chip size and the cost of the step-down regulator in accordance with embodiments of the present disclosure can be both reduced.

Figure 11:
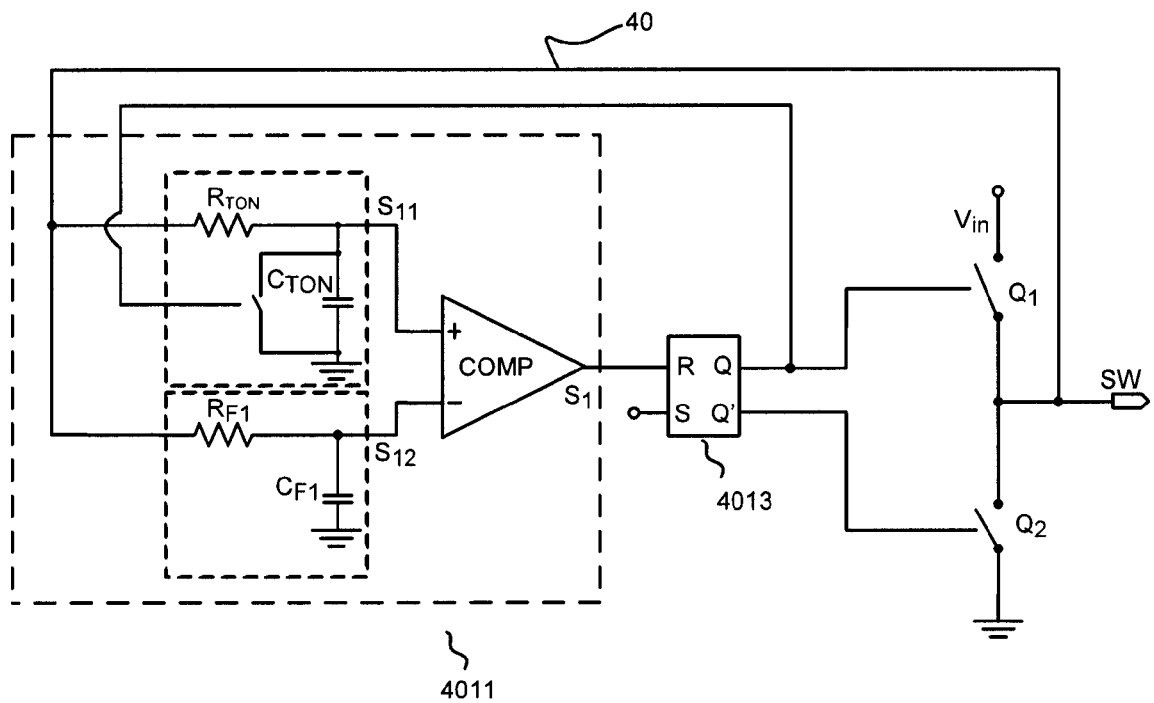
FIG. 11 illustrates a step-down regulator 40 in accordance with another embodiment of the present disclosure.

FIG. 11 illustrates a step-down regulator 40 in accordance with another embodiment of the present disclosure. As shown in FIG. 11, the step-down regulator 40 comprises an on-time generator 4011, a flip-flop 4013 and a power stage configured by switches $Q_1$ and $Q_2$. The on-time generator 4011 comprises the input voltage sensing circuit A1 of FIG. 4 and the output voltage sensing circuit B1 of FIG. 3. For convenience of description, some circuits are omitted in the step-down regulator 40 of FIG. 11, for example, the feedback control circuit is not shown in the step-down regulator 40.

As shown in FIG. 11, the on-time generator 4011 receives the switching signal SW provided by the step-down regulator 40 and the control signal Q provided by the flip-flop 4013, and provides an on-time signal $S_1$ to the reset terminal of the flip-flop 4013. The control signal Q controls the high-side switch $Q_1$, and the complementary signal Q' of the control signal Q controls the low-side switch $Q_2$. The first terminal of the high-side switch $Q_1$ receives the input voltage $V_{in}$, and the second terminal of high-side switch $Q_1$ is coupled to the first terminal of the low-side switch $Q_2$. The second terminal of the low-side switch $Q_2$ is coupled to ground. The second terminal of the high-side switch $Q_1$ and the first terminal of the low-side switch $Q_2$ are configured as the output terminal of the step-down regulator 40 and output the switching signal SW.

Figure 12:
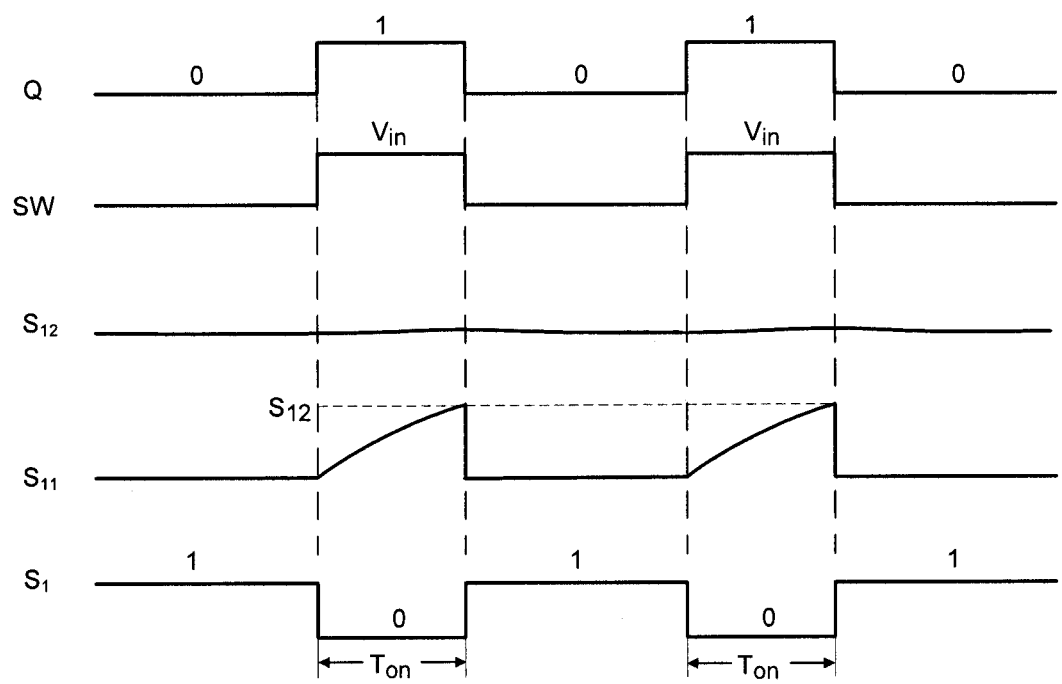
FIG. 12 illustrates the waveforms of the step-down regulator shown in FIG. 11.

FIG. 12 illustrates the waveforms of the step-down regulator 40 of FIG. 11. As shown in FIG. 11 and FIG. 12, when Q=1, the high-side switch $Q_1$ is turned on, and the switching signal SW equals to the input voltage $V_{in}$. Meanwhile, the switch K is turned off by the control signal Q, the capacitor $C_{TON}$ is charged. The input voltage sensing signal $S_{11}$ ramps up, that is, the voltage at the non-inverting input terminal of the comparator COMP ramps up. When the voltage at the non-inverting input terminal of the comparator COMP reaches the output voltage sensing signal $S_{12}$ provided by the output voltage sensing circuit, the on-time signal $S_1$ becomes logical high, that is, $S_1$=1. The on-time signal $S_1$ resets the flip-flop 4013 to change the control signal Q into logical low (Q=0). Thus, the high-side switch $Q_1$ is turned off, and the low-side switch $Q_2$ is turned on, the switching signal SW equals to 0. Meanwhile, the switch K is turned on by the control signal Q, the capacitor $C_{TON}$ is discharged, and the voltage at the non-inverting input terminal of the comparator COMP decreases rapidly to its initial value.

Figure 13:
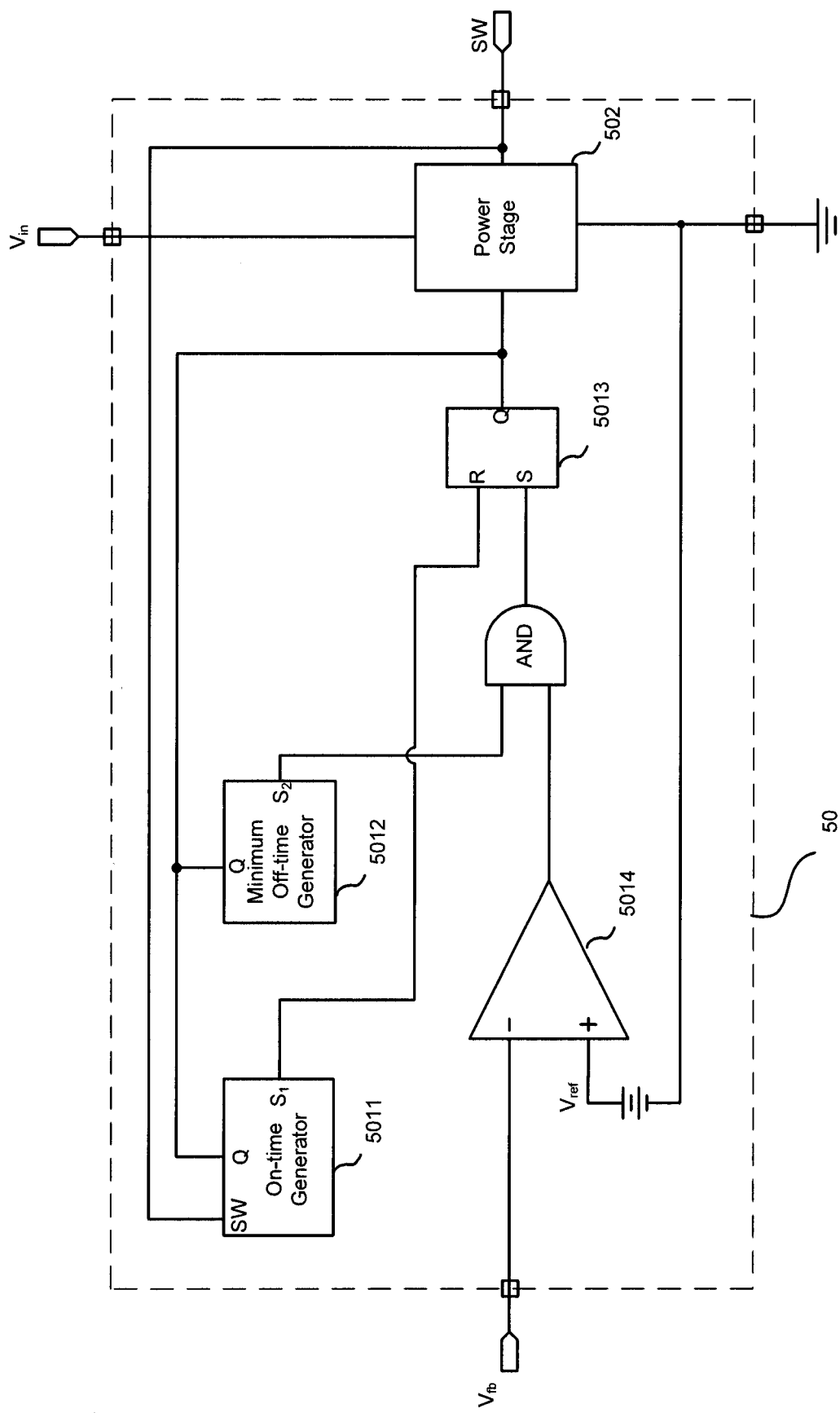
FIG. 13 illustrates a step-down regulator 50 in accordance with still another embodiment of the present disclosure.

FIG. 13 illustrates a step-down regulator 50 in accordance with still another embodiment of the present disclosure. As shown in FIG. 13, the regulator 50 comprises an on-time generator 5011, a minimum off-time generator 5012, a flip-flop 5013, a comparator 5014, an and-gate AND and a power stage 502. The on-time generator 5011 receives a switching signal SW provided by the regulator 50 and a control signal Q provided by the flip-flop 5013, and provides an on-time signal $S_1$ to the reset terminal of the flip-flop 5013. The minimum off-time generator 5012 receives the control signal Q and provides a minimum off-time signal $S_2$ to the and-gate AND. The inverting and non-inverting input terminals of the comparator 5014 respectively receives a feedback signal $V_{fb}$ provided by the regulator 50 and a reference voltage $V_{ref}$. The comparator 5014 provides an output signal to the and-gate AND at its output terminal. The and-gate AND provides an output signal to the set terminal of the flip-flop 5013. The flip-flop 5013 provides the control signal Q to the power stage 502. The power stage 502 receives an input voltage $V_{in}$ and provides an output signal as the switching signal SW of the regulator 50. Compared with the regulator 10 of FIG. 1, the regulator 50 of FIG. 13 can eliminate the output voltage pin $V_{OUT}$ and also the frequency setting pin FREQ and the external frequency setting resistor $R_{TON}$. Thus, with the PCOT control circuit in accordance with the embodiment illustrated in FIG. 13, the chip size and the cost of the regulator can be both reduced.

While at least one exemplary embodiment and method of fabrication has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A step-down regulator, comprising:
   a pseudo constant on time control circuit, wherein the pseudo constant on time control circuit comprises:
      an on-time generator comprising:
         an input voltage sensing circuit having a first input terminal, a second input terminal and an output terminal, wherein the first input terminal is configured to receive a switching signal provided by the step-down regulator, the second input terminal is configured to receive a control signal provided by the pseudo constant on time control circuit, and wherein based on the switching signal and the control signal, the input voltage sensing circuit generates an input voltage sensing signal at the output terminal;
         an output voltage sensing circuit having an input terminal and an output terminal, wherein the input terminal is configured to receive the switching signal, and wherein based on the switching signal, the output voltage sensing circuit generates an output voltage sensing signal at the output terminal; and
         a comparator having a first input terminal, a second input terminal and an output terminal, wherein the first input terminal is coupled to the output terminal of the input voltage sensing circuit to receive the input voltage sensing signal, the second input terminal is coupled to the output terminal of the output voltage sensing circuit to receive the output voltage sensing signal, and wherein based on the input voltage sensing signal and the output voltage sensing signal, the comparator generates an on-time signal at the output terminal;
      a feedback control circuit configured to receive a feedback signal representative of the output voltage of the step-down regulator, and to generate an output signal in accordance with the feedback signal; and
      a logic control circuit coupled to the on-time generator and the feedback control circuit to receive the on-time signal and the output signal, wherein based on the on-time signal and the output signal, the logic control circuit generates the control signal; and
   a power stage configured to receive an input voltage and the control signal, wherein based on the input voltage and the control signal, the power stage generates the switching signal.

2. The step-down regulator of claim 1, wherein the input voltage sensing circuit comprises:
   a first resistor having a first terminal and a second terminal, wherein the first terminal is coupled to the power stage to receive the switching signal;
   a capacitor having a first terminal and a second terminal, wherein the first terminal is coupled to the second terminal of the first resistor and provides the input voltage sensing signal, and the second terminal is grounded; and
   a switch having a first terminal, a second terminal and a control terminal, wherein the control terminal is coupled to the logic control circuit to receive the control signal, the first terminal is coupled to the first terminal of the capacitor, and the second terminal is grounded.

3. The step-down regulator of claim 2, wherein the input voltage sensing circuit further comprises a linear current compensation circuit having an input terminal and an output terminal, wherein the input terminal is coupled to the output terminal of the input voltage sensing circuit to receive the input voltage sensing signal, and wherein based on the input voltage sensing signal ,the linear current compensation circuit provides a linear compensation current to the capacitor so that the input voltage sensing signal varies linearly with the input voltage.

4. The step-down regulator of claim 3, wherein the linear current compensation circuit comprises:
   an operational amplifying circuit having an input terminal and an output terminal, wherein the input terminal is coupled to the output terminal of the input voltage sensing circuit to receive the input voltage sensing signal; and
   a current mirror circuit having an input terminal and an output terminal, wherein the input terminal is coupled to the output terminal of the operational amplifying circuit, and the output terminal is coupled to the first terminal of the capacitor to provide the linear compensation current.

5. The step-down regulator of claim 4, wherein the current mirror circuit comprises:
   a current mirror having an input terminal and an output terminal, wherein the output terminal is coupled to the first terminal of the capacitor to provide the linear compensation current;
   a first linear voltage regulating component having a first terminal, a second terminal and a control terminal, wherein the control terminal is coupled to the output terminal of the operational amplifying circuit, the first terminal is coupled to the input terminal of the current mirror; and
   a second resistor having a first terminal and a second terminal, wherein the first terminal is coupled to the second terminal of the first linear voltage regulating component, and the second terminal is grounded, further wherein the first resistor and the second resistor have the same resistance.

6. The step-down regulator of claim 5, wherein the operational amplifying circuit comprises:
   a current source having an input terminal and an output terminal, wherein the input terminal is configured to receive a power supply voltage; and
   a second linear voltage regulating component having a first terminal, a second terminal and a control terminal, wherein the control terminal is coupled to the output terminal of the input voltage sensing circuit to receive the input voltage sensing signal, the first terminal is coupled to the output terminal of the current source and the control terminal of the first linear voltage regulating component, and the second terminal is grounded, further wherein the first and second linear voltage regulating components have opposite characteristic parameters.

7. The step-down regulator of claim 5, wherein the first linear voltage regulating component is a MOSFET or a BJT.

8. The step-down regulator of claim 5, wherein the operational amplifying circuit comprises an operational amplifier having a first input terminal, a second input terminal and an output terminal, wherein the first input terminal is coupled to the output terminal of the input voltage sensing circuit to receive the input voltage sensing signal, the second input terminal is coupled to the first terminal of the second resistor, and the output terminal is coupled to the control terminal of the first linear voltage regulating component.

9. The step-down regulator of claim 1, wherein the output voltage sensing circuit comprises a low-pass filter.

10. The step-down regulator of claim 9, wherein the low-pass filter comprises:
    a filtering resistor having a first terminal and a second terminal, wherein the first terminal is coupled to the power stage to receive the switching signal; and
    a filtering capacitor having a first terminal and a second terminal, wherein the first terminal is coupled to the second terminal of the filtering resistor and provides the output voltage sensing signal, and the second terminal is grounded.

11. A pseudo constant on time control circuit for a step-down regulator, comprising:
    an on-time generator comprising:
        an input voltage sensing circuit having a first input terminal, a second input terminal and an output terminal, wherein the first input terminal is configured to receive a switching signal provided by the step-down regulator, the second input terminal is configured to receive a control signal provided by the pseudo constant on time control circuit, and wherein based on the switching signal and the control signal, the input voltage sensing circuit generates an input voltage sensing signal at the output terminal;
        an output voltage sensing circuit having an input terminal and an output terminal, wherein the input terminal is configured to receive the switching signal, and wherein based on the switching signal, the output voltage sensing circuit generates an output voltage sensing signal at the output terminal; and
        a comparator having a first input terminal, a second input terminal and an output terminal, wherein the first input terminal is coupled to the output terminal of the input voltage sensing circuit to receive the input voltage sensing signal, the second input terminal is coupled to the output terminal of the output voltage sensing circuit to receive the output voltage sensing signal, and wherein based on the input voltage sensing signal and the output voltage sensing signal, the comparator generates an on-time signal at the output terminal;
    a feedback control circuit configured to receive a feedback signal representative of the output voltage of the step-down regulator, and to generate an output signal in accordance with the feedback signal; and
    a logic control circuit coupled to the on-time generator and the feedback control circuit to receive the on-time signal and the output signal, wherein based on the on-time signal and the output signal, the logic control circuit generates the control signal.

12. The pseudo constant on time control circuit of claim 11, wherein the input voltage sensing circuit comprises:
    a first resistor having a first terminal and a second terminal, wherein the first terminal is configured to receive the switching signal;
    a capacitor having a first terminal and a second terminal, wherein the first terminal is coupled to the second terminal of the first resistor and provides the input voltage sensing signal, and the second terminal is grounded; and
    a switch having a first terminal, a second terminal and a control terminal, wherein the control terminal is coupled to the logic control circuit to receive the control signal, the first terminal is coupled to the first terminal of the capacitor, the second terminal is grounded.

13. The pseudo constant on time control circuit of claim 12, wherein the input voltage sensing circuit further comprises a linear current compensation circuit having an input terminal and an output terminal, wherein the input terminal is coupled to the output terminal of the input voltage sensing circuit to receive the input voltage sensing signal, and wherein based on the input voltage sensing signal, the linear current compensation circuit provides a linear compensation current to the capacitor so that the input voltage sensing signal varies linearly with the input voltage.

14. The pseudo constant on time control circuit of claim 13, wherein the linear current compensation circuit comprises:
    an operational amplifying circuit having an input terminal and an output terminal, wherein the input terminal is coupled to the output terminal of the input voltage sensing circuit to receive the input voltage sensing signal; and
    a current mirror circuit having an input terminal and an output terminal, wherein the input terminal is coupled to the output terminal of the operational amplifying circuit, and the output terminal is coupled to the first terminal of the capacitor to provide the linear compensation current.

15. The pseudo constant on time control circuit of claim 14, wherein the current mirror circuit comprises:
    a current mirror having an input terminal and an output terminal, wherein the output terminal is coupled to the first terminal of the capacitor to provide the linear compensation current;
    a first linear voltage regulating component having a first terminal, a second terminal and a control terminal, wherein the control terminal is coupled to the output terminal of the operational amplifying circuit, the first terminal is coupled to the input terminal of the current mirror; and
    a second resistor having a first terminal and a second terminal, wherein the first terminal is coupled to the second terminal of the first linear voltage regulating component, and the second terminal is grounded, further wherein the first resistor and the second resistor have the same resistance.

16. The pseudo constant on time control circuit of claim 15, wherein the operational amplifying circuit comprises:
 a current source having an input terminal and an output terminal wherein the input terminal is configured to receive a power supply voltage; and
 a second linear voltage regulating component having a first terminal, a second terminal and a control terminal, wherein the control terminal is coupled to the output terminal of the input voltage sensing circuit to receive the input voltage sensing signal, the first terminal is coupled to the output terminal of the current source and the control terminal of the first linear voltage regulating component, and the second terminal is grounded, further wherein the first and second linear voltage regulating components have opposite characteristic parameters.

17. The pseudo constant on time control circuit of claim 11, wherein the output voltage sensing circuit comprises a low-pass filter.

18. A step-down regulator, comprising:
 an on-time generator configured to receive a switching signal provided by the step-down regulator, and to receive a control signal, wherein based on the switching signal and the control signal, the on-time generator generates an on-time signal;
 a minimum off time generator configured to receive the control signal, and to generate a minimum off time signal in accordance with the control signal;
 a comparator configured to receive a feedback signal representative of the output voltage of the step-down regulator, and to receive a reference signal, and wherein based on the feedback signal and the reference signal, the comparator generates a comparison signal;
 an and-gate coupled to the comparator and the minimum off time generator to receive the comparison signal, and to receive the minimum off time signal, wherein based on the comparison signal and the minimum off time signal, the and-gate generates an output signal;
 a flip-flop having a set terminal, a reset terminal and an output terminal, wherein the reset terminal is coupled to the on-time generator to receive the on-time signal, and the set terminal is coupled to the and-gate to receive the output signal, wherein based on the on-time signal and the output signal, the flip-flop generates the control signal; and
 a power stage coupled to the output terminal of the flip-flop to receive the control signal, wherein based on the control signal, the power stage converts an input voltage into the switching signal.

\* \* \* \* \*